United States Patent [19]

Tolliver et al.

[11] Patent Number: 4,896,943

[45] Date of Patent: Jan. 30, 1990

[54] ENCAPSULATED-LENS RETROREFLECTIVE SHEETING HAVING IMPROVED COVER FILM

[75] Inventors: Howard R. Tolliver, Woodbury; Roger R. Kult, Maplewood; Terry R. Bailey, Woodbury; Arthur D. Dickson, St. Paul, all of Minn.

[73] Assignee: Minnesota Mining and Manufacturing Company, St. Paul, Minn.

[21] Appl. No.: 49,674

[22] Filed: May 13, 1987

[51] Int. Cl.$^4$ .............................................. G02B 5/128
[52] U.S. Cl. ...................................... 350/105; 350/104
[58] Field of Search ........................ 350/102, 104, 105

[56] References Cited

U.S. PATENT DOCUMENTS

| | | | |
|---|---|---|---|
| 2,407,680 | 3/1945 | Palmquist et al. | 88/82 |
| 3,190,178 | 6/1961 | McKenzie | 88/82 |
| 3,874,914 | 4/1975 | Travis | 156/334 |
| 3,935,359 | 1/1976 | Rowland | 350/103 |
| 4,025,159 | 5/1977 | McGrath | 350/105 |
| 4,288,493 | 9/1981 | Kropp | 428/355 |
| 4,618,518 | 10/1986 | Pricone et al. | 350/105 |
| 4,637,950 | 1/1987 | Bergeson et al. | 350/105 |
| 4,663,213 | 5/1987 | Bailey et al. | 428/204 |
| 4,664,966 | 5/1987 | Bailey et al. | 428/203 |

Primary Examiner—Bruce Y. Arnold
Assistant Examiner—Terry S. Callaghan
Attorney, Agent, or Firm—Donald M. Sell; Walter N. Kirn; Robert H. Jordan

[57] ABSTRACT

An encapsulated-lens retroreflective sheeting comprising a monolayer of lenses partially embedded in a binder layer, a specularly reflective layer underlying the lenses, and a cover film sealed to the binder layer along a network of interconnecting lines forming hermetically sealed cells within which the lenses are encapsulated and have an air interface, wherein the cover film comprises polyethylene, or polypropylene, or a copolymer comprising a major portion by weight of at least one of ethylene or propylene and a minor portion by weight of a comonomer. Such a cover film affords high flexibility, improved impact resistance, resistance to moisture absorption, and greater toughness to the retroreflective sheeting. In some embodiments the cover film is multilayer.

25 Claims, 2 Drawing Sheets

ENCAPSULATED-LENS RETROREFLECTIVE SHEETING HAVING IMPROVED COVER FILM

FIELD OF INVENTION

The invention concerns encapsulated-lens retroreflective sheeting of the type disclosed in U.S. Pat. No. 3,190,178 (McKenzie) having a binder layer in which a monolayer of lenses such as glass microspheres is partially embedded. A cover film is sealed to the binder layer such that the lenses are encapsulated within hermetically sealed cells.

Background Art

The earliest retroreflective sheeting had an exposed-lens construction, and reflex-reflection of light by such a sheeting was prevented when the lenticular surfaces of the exposed lenses were covered with water. This problem was answered by enclosed-lens retroreflective sheeting in which, as first taught in U.S. Pat. No. 2,407,680 (Palmquist et al.), the lenses were embedded within the sheeting which had a flat, transparent cover film. Such an embedding allowed incident light rays to be focused onto the specularly reflective layer irrespective of whether the font of the sheet was wet or dry. The invention taught in the above-cited McKenzie patent solved the same problem in a different way, namely, by covering the partially embedded lenses of an exposed-lens type sheeting with a cover film spaced above the lens. The binder layer of the sheeting is sealed to the cover film along a network of interconnecting lines, thus forming a plurality of hermetically sealed cells within which the lenses are encapsulated and have an air interface. Such exposed-lens sheeting is sometimes called "encapsulated-lens retroreflective sheeting".

While cover films serve to prevent the direct wetting of the front surfaces of the microlenses such as by rain, moisture may still penetrate the cover film, enter the individual sealed cells, and interfere with effective retroreflection. Therefore, a cover film is preferably substantially impermeable to the migration of moisture therethrough. Furthermore, the cover film should not tend to absorb moisture and become clouded or structurally weakened.

In addition to keeping water from the front surfaces of the lenses and thereby preserving the necessary optical relationships for effective retroreflection, the cover film should protect the underlying elements of the retroreflective sheeting against adverse effects of ultraviolet radiation and moisture penetration, as well as being itself weatherable and tough throughout the expected range of environmental temperatures. It should also have a smooth surface that is highly transmissive to light and should resist dirt accumulation. It is further desired for some uses that the cover film also be receptive to coatings such as marking compositions (e.g., inks).

The overall flexibility and elongation of an encapsulated-lens retroreflective sheeting is substantially affected by the nature of the cover film. Some commonly used cover films, such as polymethyl methacrylate, are not sufficiently flexible and occasionally not sufficiently tough for use in such applications as traffic markers or cones where high flexibility and toughness is preferred.

SUMMARY OF INVENTION

The present invention provides encapsulated-lens retroreflective sheetings having an improved cover film such that such sheetings offer improved flexibility, extensibility, resistance to cracking, and toughness. The cover films provided herein offer excellent impermeability to water, are generally abrasion- and solvent-resistant, and exhibit good durability to weathering as well as high impact resistance, even at cold temperatures. Furthermore, such cover films are typically less expensive than many conventional cover film materials.

Briefly summarizing, the encapsulated-lens retroreflective sheeting of the invention, like that of the McKenzie patent, comprises a binder layer in which lenses such as glass microspheres are partially embedded and arranged in a monolayer, a specularly reflective layer underlying the microspheres, and a cover film sealed to the binder layer along a network of interconnecting lines forming hermetically sealed cells within which the lenses are encapsulated and have an air interface. The novel retroreflective sheeting differs from that of the McKenzie patent in that the cover film comprises polyethylene, or polypropylene, or a copolymer comprising a major portion by weight of at least one of ethylene or propylene and a minor portion by weight of at least one other comonomer, or blends thereof. Examples of suitable comonomers include acrylic acid, methacrylic acid, vinyl acetate, and ethyl acrylate. Such cover films are sometimes referred to herein as "polyolefin-based" cover films. In some embodiments, the cover film may be multi-layer, e.g., dual layer.

According to the present invention, encapsulated-lens retroreflective sheetings may be made with the cover films disclosed herein and with a variety of binder materials. In some embodiments the cover film or binder material may be primed to achieve desired high adhesion therebetween. In some embodiments, a marking composition (e.g., ink) may be applied to the outside surface of the cover film.

BRIEF DESCRIPTION OF DRAWINGS

The present invention will be further explained with reference to the drawing, wherein.

These figures, which are not to scale, are idealized and are intended to be merely illustrative and not limiting.

DETAILED DESCRIPTION OF INVENTION

Figure 1:
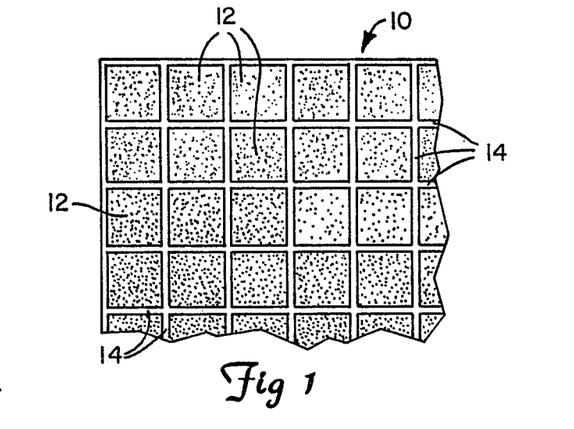
FIG. 1 is a top view of a portion of an encapsulated-lens retroreflective sheeting of the invention.

As described above, the retroreflective sheetings of the invention comprise a binder layer in which lenses are partially embedded and arranged in a monolayer, a specularly reflective layer underlying the lenses, and a cover film sealed to the binder layer along a network of interconnecting lines forming hermetically sealed cells within which the lenses are encapsulated and have an air interface. FIG. 1 is a top view of portion 10 of encapsulated-lens retroreflective sheeting of the invention having cells 12 that each contain several tens or hundreds of individual retroreflective elements. Narrow intersecting bonds or seal legs 14 separate cells 12, hermetically sealing same and bonding the cover film and binder layer together.

Figure 2:
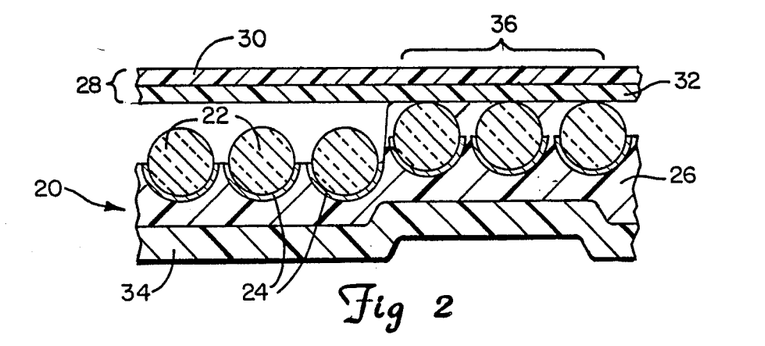
FIG. 2 is a cross-sectional representation of a portion of an encapsulated-lens retroreflective sheeting comprising a cover film of the invention.

The portion 20 of retroreflective sheeting shown in FIG. 2 has a monolayer of glass microspheres 22, specularly reflective layers 24, binder layer 26, and dual-layer cover film 28 consisting of outer layer 30 and inner layer 32. On the back side of binder layer 26 is shown disposable low-adhesion carrier web 34 which prevents sticking in the die used to form the network of intersecting bonds 36 between cover film 28 and binder layer 26.

To comment on the schematic nature of FIG. 2, microspheres 22 will rarely be of essentially uniform size, and the thicknesses of the layers of the sheeting retroreflective sheeting may vary from area to area. Inner layer 32 may be in tangential contact with some of the underlying microspheres or not, depending upon a host of incidental factors.

Figure 3:
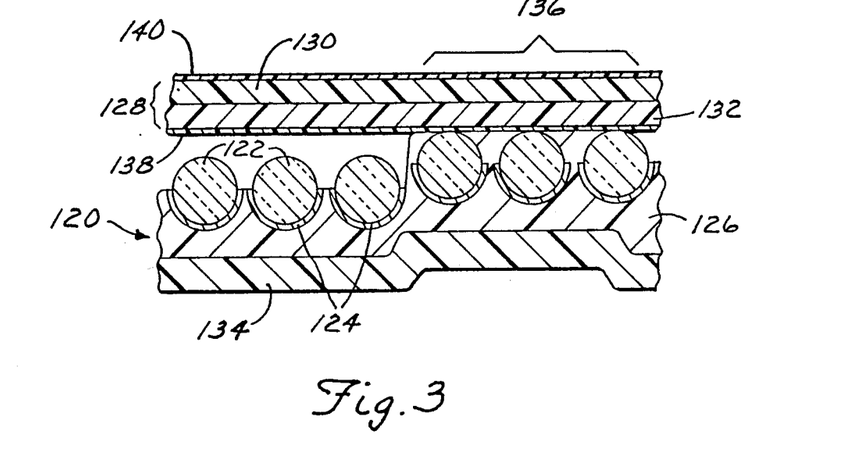
FIG. 3 is a cross-sectional representation of a portion of an encapsulated-lens retroreflective sheeting comprising a different embodiment of a cover film of the invention which has a priming layer and a conditioning layer.

The portion 120 of retroreflective sheeting shown in FIG. 3 on carrier web 134 has microspheres 122, specularly reflective layers 124, binder layer 126, dual layer cover film 128 consisting of outer layer 130, inner layer 132, priming layer 138, and conditioning layer 140.

The lenses are preferably glass microspheres that have an index of refraction of about 1.9. The diameter of each microsphere is preferably between about 50 and about 200 micrometers. Most preferred are microspheres which have an average diameter of about 65 micrometers. The specularly reflective layer typically comprises a material such as vapor-coated aluminum.

The binder layer typically comprises a flexible and durable polymeric material providing good adhesion to the lenses. The binder layer typically further comprises a whitening agent such as a pigment, e.g., titanium dioxide, to increase the overall whiteness of the sheeting. Alternatively, however, the binder layer may comprise an agent selected to impart a different color thereto.

Best results have been achieved when the cover film has comprised a homopolymer of ethylene or propylene, or a copolymer of monomers comprising a major portion by weight of at least one of ethylene or propylene and a minor portion of at least one other monomer. Substantially transparent blends of polymers with such homopolymers or copolymers may be employed.

Among preferred cover films are ethylene copolymers, a number of which are commercially available at reasonable cost, including:

| Supplier | Designation | Comonomer | Weight % | Melt Index |
|---|---|---|---|---|
| Dow Chemical Company | PRIMACOR 3440 | Acrylic acid | 9 | 10 |
| E. I. DuPont | NUCREL | Methacrylic acid | 10 | 35 |
| E. I. DuPont | ELVAX 460 | Vinyl acetate | 18 | 2.5 |
| E. I. DuPont | Surlyn 1706 | Methacrylic acid | 15 | 0.7 |
| E. I. DuPont | NuCrel 035[1] | Methacrylic acid Isobutyl acrylate | 10 10 | 35 |

[1]NuCrel 035 is believed to be a terpolymer.

Each of these polymers has excellent flexibility, high impact-resistance, and high toughness at temperatures as low as −40° F. (−40° C.).

Copolymers of monomers comprising by a weight a major portion of at least one of ethylene or propylene and a minor portion of an acid-functional monomer such as acrylic acid or methacrylic acid, which copolymer has been crosslinked by cations such as zinc, sodium, or potassium may be used and are referred to herein as "ionomeric copolymers". Such copolymers typically provide improved tensile strength, abrasion-resistance, and enhanced solvent-resistance. Those ionomeric copolymers that are crosslinked with zinc further are preferred because it is believed to afford the best resistance to weathering. A preferred commercially available ionomeric ethylene copolymer is SURLYN 1706 from E. I. DuPont, a copolymer of ethylene and a minor portion of methacrylic acid ionically crosslinked with zinc ions.

Typically polymers having a melt index of below about 300 are preferred, those having a melt index below about 100 are more preferred, and those having a melt index below about 20 are most preferred. Typically materials having a lower melt index tend to be easier to extrude and more resistant to softening at higher temperatures.

An advantage of the materials disclosed herein is that the cover film may be extruded rather than cast from solution, thereby avoiding the cost of solvent and possible pollution from driving off the solvent. Furthermore, extrusion permits faster production rates as compared to the time delay in drying a solvent-cast film.

Preferably the cover film will be highly transparent, i.e., have a high transmittance of visible light, in order to enhance the retroreflective brightness of the sheeting. Typically, the cover films of the invention will have a transmittance of at least 75 percent, and preferably at least 85 percent. The copolymers described above typically tend to have high clarity, i.e., high transmittance. Cover films comprising a layer of polyethylene will typically have higher clarity if quenched soon after extrusion so as to contain a high portion of amorphous phase polyethylene. Low density polyethylene is typically preferred because it is inherently less crystalline and therefore is more highly transparent than high density polyethylene.

Cover films comprising polyethylene, especially high density polyethylene, may tend to curl and are typically also less preferred for that reason.

Typically, a stabilizer may be incorporated in the cover film. Such a weathering stabilizer may include weathering agents, preservatives, antioxidants, or energy quenchers. For instance, hindered amine light stabilizers have been found useful in the cover films disclosed herein. The cover film will typically also contain an ultraviolet radiation absorber to protect the cover film as well as the underlying elements of the retroreflective sheeting.

Furthermore, a colorant such as a dye may be incorporated in the cover film to impart desired color thereto. Such colorants are preferably selected and/or used in appropriate amounts so as to not interfere with the other desired properties of the cover film, e.g., transmittance or flexibility, or with adhesion of the binder material to the cover film.

Adhesion of the binder material to the inner surface of the cover film is typically enhanced if the binder material is highly compatible with, i.e., has a great affinity to, the inner surface of the cover film at useful sealing temperatures, e.g., about 170° F. (75° C.). Such compatibility may be achieved if the cover film and binder material are of the same polymer family, i.e., both are olefin-based such as the cover films disclosed herein. Alternatively, the cover film and/or binder layer may be primed, e.g., by corona treatment or with an added layer, to improve the adhesion therebetween, even if the cover film and binder material are of different polymer families. For instance, aziridine has been added to urethane-based priming layers which are applied as the inner surface of olefin-based cover films such as disclosed herein to provide good adhesion and surface receptivity to a urethane-based binder material. The aziridine-containing priming layer adheres well to the olefin-based cover film and provides a receptive surface to which the urethane-based binder material would not typically adhere well, thereby providing the desired high adhesion between the cover film and binder layer. Aziridine has been similarly used in priming layers used to adhere the cover films disclosed herein to binder materials of a variety of chemical compositions, e.g., in acrylic- and vinyl-based primers.

The cover film materials disclosed herein tend to have greater toughness, flexibility, and extensibility, and to produce encapsulated-lens retroreflective sheetings having such properties, than do materials which have been used in the prior art for transparent cover films.

In some instances it will be desired to provide multi-layer cover films, e.g., dual-layer cover films. In such instances, at least one layer of the cover film will contain one of the aforementioned homopolymers, copolymers, or blends comprising same. For instance, a cover film comprising an inner layer of ethylene/acrylic acid copolymer and an outer layer of polyethylene terephthlate will possess excellent resistance to dirt accumulation and high tensile strength. Alternatively, a multi-layer cover film of the present invention may comprise two or more layers that contain one of the aforementioned homopolymers, copolymers, or blends comprising same. For example, a dual layer cover film may comprise an inner layer containing ethylene/acrylic acid copolymer and an outer layer containing Surlyn 1706, an ionomeric copolymer of an ethylene and methacrylic acid crosslinked with zinc, to provide a cover film possessing improved tensile strength and exceptional abrasion resistance.

In such multi-layer cover films, additives such a the stabilizers and colorants may be incorporated in one or more of the individual layers within the cover film. For instance, an ultraviolet radiation absorber may be incorporated in the outer layer of the cover film to protect the inner layer thereof as well as the outer portions of the sheeting.

The materials used in the respective layers of the cover film should be capable of bonding securely together, preferably substantially inseparably so, such that the multi-layer cover film will not delaminate. Multi-layer cover films may typically be formed by coextrusion, extrusion of an additional layer onto a previously formed counterpart, or by combination of preformed layers, e.g., heat lamination. Coextrusion is typically preferred because of the strong interlayer bonds which may be attained thereby.

The relative thickness of the member layers within a multilayer cover film of the invention will be determined in part by the needs of the specific application. For instance, a dual-layer cover film may comprise an inner layer containing one of the aforementioned homopolymers, copolymers, or blends and an outer layer containing an exceptionally hard material that resists dirt accumulation, such as unplasticized vinyls. Because such outer layers (i.e., unplasticized vinyls) are typically somewhat inflexible, such a cover film may have a relatively thin outer layer and relatively thick inner layer (for instance, about a 1:9 ratio of thicknesses) to maximize the desired flexibility and toughness provided by the inner layer and yet retain the desired resistance to dirt accumulation and abrasion resistance.

Cover films of the invention will generally be at least 1 mil thick, and typically be between 1 and 10 mils thick, and more typically between 2 and 6 mils thick.

Sheetings of the invention are typically assembled by preparing a base sheet comprising the binder layer, lenses partially embedded therein, and specularly reflective layer; contacting the preformed cover film thereto; and laminating the construction together with heat and pressure to provide the pattern of intersecting bonds between the binder layer and the cover film. Such a method is disclosed in the aforementioned McKenzie patent.

It may be desired to then expose the laminated retroreflective sheeting to an electron beam (i.e., "e-beam") to partially cross-link the cover film to thereby enhance the solvent-resistance and increase the resistance to softening at elevated temperatures of the cover film. Such exposure may also improve the receptivity of the outside surface of the cover film to inks for printing markings thereon, and in the case of multi-layer cover films will typically improve the intra-layer adhesion therein.

It may be desired in some instances to apply a conditioning layer to the outside surface of the cover film, such a layer being receptive to the application of marking compositions, e.g., inks, to enable the application of legends to the face of retroreflective sheeting. Such a conditioning layer is preferably substantially transparent. An example thereof is water borne urethane with an aziridine crosslinker.

The cover films provided herein, particularly the copolymers described above, are typically quite tough and flexible, thus serving to provide great protection and durability to the resultant retroreflective sheeting. Furthermore, the cover films disclosed herein are very impermeable to water and offer high impact resistance even at low temperatures, thereby rendering retroreflective sheetings comprising such cover films to be of great utility in damp environments and for rough use.

The present invention will now be further explained by the following illustrative Examples. In the Examples, all amounts are reported in parts by weight unless otherwise indicated.

Testing

The following tests were used to evaluate the encapsulated-lens retroreflective sheetings discussed in the Examples.

Tensile and Elongation

ASTM Test Method D882-80a in the down web direction.

Retroreflective Measurements

Retroreflective Intensity is measured using a retroluminometer as described in U.S. defensive publication T987,003 at a 0.2° divergence angle and entrance angles of −4° and +40°. The Half Brightness Angle (HBA) is the entrance angle at which the retroreflective sample retains one half its original −4° Retroreflective Intensity.

Water Absorbtion and Penetration

The retroreflective brightness of the retroreflective sheeting in question is measured, and then a sample of the sheeting is adhered to an aluminum panel and immersed in a container of tap water for 24 hours. After removal from the container, the surface of the sample is wiped dry and then the retroreflective brightness measured. Water absorbtion by the cover film and water penetration into the cells of the encapsulated-lens sheeting is indicated by reduction in the retroreflective brightness of the sheeting.

Impact Resistance

Tested at −10° F. (−23° C.) according to ASTM D2794-82 using a 0.6 millimeter thickness aluminum panel to which the retroreflective sheeting is attached. The indentation is in extrusion direction, and the punch has a diameter of 15.9 millimeters.

Water Spray

The resistance of the cover film to a high pressure water spray is determined using a HYDRA CLEAN No. 2104ET Model 800-054 Series A with HYDRA No. 7 nozzle, available from Graco, Inc. A sample of the sheeting in question is adhered to an aluminum panel which was then clamped at a 45 angle at a distance of 8 inches from the nozzle (believed to have a fan angle of 15 and to exert a pressure of 1050 pounds/inch$^2$), and sprayed for 30 seconds. The samples were then visually inspected for damage to the cover film that would indicate failure of the cover film.

EXAMPLE 1

A polyethylene-coated paper carrier was heated to about 105° C. and then flooded with glass microspheres having an average diameter of about 65 microns and a refractive index of about 1.91. The excess microspheres were removed from the surface of the carrier to leave substantially a monolayer of microspheres thereon, and the carrier and monolayer of microspheres then heated to about 140° C. to soften the polyethylene coating such that the microspheres were embedded therein to a depth of about 30 percent of their diameter by gravity and capillary forces. The carrier and monolayer of microspheres were then put into a vacuum chamber and a layer of aluminum deposited thereon to a thickness of about 100 nanometers.

A binder material comprising 82 parts of a thermoplastic aliphatic urethane binder (Q-THANE P3429, available from K. J. Quinn and Co., Inc. and believed to comprise the reaction product of 1,1-methylene bis(4-isocyanto-cyclohexane), adipic acid, isophthalic acid, and 1,4-butane diol) and 18 parts of rutile titanium dioxide was dried in a dehumidification drier at 66° C. for 6 hours and then extruded onto the polyethylene side of a duplex carrier comprising a 12.5 micron layer of low-density polyethylene and a 12.5 micron layer of polyester. Extrusion conditions were as follows: 171° C., 193° C., 210° C., and 216° C. The extrusion die and plates were set at 204° C. and the body of the die at 193° C. Extrusion screw speed and film take-away speed were adjusted to provide a binder film of about 50 microns thickness.

The aluminum side of the monolayer of microspheres was contacted to the binder film and transferred thereto. The transfer conditions included a hot can temperature of 110° C., an applied pressure of 25.2 kilograms/centimeter width, and a line speed of 32 meters/minute. These conditions embed the microspheres to about 20 percent of their diameter in the binder material. The polyethylene-coated paper carrier can then be stripped from the microspehres which remain in the binder film.

Visual examination with a microscope of the carrier revealed that essentially all of the microspheres had been transferred to the binder film, and that essentially all of the aluminum vapor coat that had been deposited on the carrier between individual microspheres remained on the carrier without transfer to the binder film.

A transparent cover film comprising: 97.4 parts of PRIMACOR 3440 (an extrusion grade, thermoplastic, high molecular weight copolymer believed to comprise a major portion of ethylene monomer and a minor portion of acrylic acid monomer, available from DuPont, having a melt flow index of about 10); and 2.6 parts of a stabilizing system (1.0 part of ultraviolet absorber, 1.5 parts of a hindered amine, and 0.1 parts of an antioxidant; the stabilizing system is not believed to affect the strength of the cover film or its adhesion to other materials), was extruded as follows. The stabilized copolymer was extruded from a 6.3 centimeter extruder through a 40.6 centimeter die onto a biaxially-oriented polyethylene terephthalate (PET) carrier using a single-flighted screw with a compression ratio of 3:1. The extruder temperatures were 190° C., 260° C., 273° C., 264° C., and 264° C. for zones 1 through 5, respectively. The extruder neck and die lips were at 270° C. The extruder screw speed was 30 rpm while the film take-away speed was adjusted to provide a film having a thickness of about 100 microns. The extruded film was then wound upon itself into roll form.

One side of the cover film was chosen as the inner surface thereof, corona treated at 0.39 kilowatts per meter$^2$ per minute, and then coated with a priming solution comprising 75.0 parts NeoRez R960 (available from Polyvinyl Chemicals Co., believed to comprise water-borne aliphatic urethane), 14.9 parts water, 0.2 parts Witco 3056A bubble breaker, 7.5 parts ethyl alcohol, 0.1 part of a fluorocarbon leveling agent, and 2.3 parts CX-100 (100 percent active polyfunctional aziridine liquid crosslinker from Polyvinyl Chemicals Co.) applied with a 150 line quadrangular knurl coater. The coating was then dried for 10 minutes at room temperature and then cured for 1 minute at 130° C. to yield a priming layer having an approximate dry thickness of 2 microns.

The cover film just described was applied to the monolayer of microspheres on the base sheet, primed side down, and sealed thereto along a network of interconnecting bonds under the following conditions:

Embossing can temperature - 360° F. (180° C.)
Binder preheat temperature - 300° F. (150° C.)
Embossing can speed - 19 feet/minute (5.8 meters/minute)
Nip roll pressure - 60 pounds/inch-width (69 kilograms/centimeter-width)

After removing the duplex carrier from the binder, an acrylic pressure-sensitive adhesive was applied to the exposed binder layer (side away for the microspheres). Finally the PET carrier was removed from the cover film.

The properties of the resultant retroreflective sheeting are tabulated in Table 1 below.

EXAMPLE 2

Retroreflective sheeting was prepared in Example 1 except the cover film comprised a thermoplastic homopolymer polyethylene, NPE 3011, believed to be a low density resin with a specific gravity of about 0.924 gram/cubic centimeter and a melt flow index of about 5.0, available from Enron Chemical Co. The polyethylene was stabilized with 1.0 part ultraviolet absorber, 1.5 parts of a hindered amine, and 0.1 parts of an antioxidant. The cover film was primed with the priming solution described in Example 1 before being laminated to the base sheet.

The cover film just described was applied to the monolayer of microspheres on the base sheet, primed side down, and sealed thereto along a network of interconnecting bonds under the following conditions:

Embossing can temperature - 360° F. (180° C.)
Binder preheat temperature - 300° F. (150° C.)
Embosing can speed - 9.5 feet/minute (2.9 meters/minute)
Nip roll pressure - 60 pounds/inch-width (69 kilograms/centimeter-width)

The properties of the resultant retroreflective sheeting are tabulated in Table 1 below.

EXAMPLE 3

Retroreflective sheetings were prepared as in Example 1 except the cover film was a duplex film comprising one mil of a polyethylene terephalate and one mil of Surlyn 1652. The Surlyn portion of the duplex was then primed as in Example 1.

Sealing conditions were:
Embossing can temperature - 180° C.
Binder preheat temperature - 150° C.
Speed - 16 feet per minute
Nip roll pressure - 69 kilograms per meter width The properties of the resultant retroreflective sheeting are tabulated in Table 1 below.

EXAMPLE 4

Glass beads or microspheres having an average diameter of about 65 micrometers and a refractive index of 1.91 were flooded onto a polyethylene-paper carrier web which had been heated to about 105° C. Substantially a monolayer of the beads adhered to the polyethylene, and the excess fell off the web. The glass-bead coated polyethylene paper was then heated in an oven at about 140° C. to soften the polyethylene so that the glass beads were drawn into the polyethylene to about 30% of their diameter by gravity and capillary forces.

In a vacuum chamber, aluminum was deposited over the monolayer of glass beads to a thickness of about 100 nm.

Onto a 20-miorometer PET support film was extruded a HMW thermoplastic binder film formed from a mixture of pellets of which 69.0 parts were a ethylene/methacrylic acid (EMAA) copolymer and 31.0 parts were a concentrate consisting of 11.9 parts of a polyethylene/vinyl acetate (EVA) copolymer, 18.0 parts of rutile titanium dioxide white pigment, and 1.1 parts of a weathering stabilizer system which in turn consisted of 1 part hindered amine light stabilizer and 0.1 part of antioxidant. The EMAA copolymer comprised 89 parts ethylene and 11 parts methacrylic acid ("Elvax II" 5720 of E.I. DuPont de Nemours & Co.).

The EVA copolymer had a melt flow index of 110 and was understood to be a copolymer of 72 parts ethylene and 28 parts vinyl acetate ("Elvax" 30) The extruder had a diameter of 4.4 cm and a length/diameter ratio of 30:1. The extruder temperature profile (from hopper end to die) was set at 77°, 204°, 149°, 121° C. The polymer transfer tube was set at 132° C., while the film die was set at 143° C. Extruder screw speed was adjusted to 26 rpm while the film takeaway was adjusted to 12.2 m/min. to provide a binder film thickness of about 50 micrometers.

The aluminum side of the monolayer of microspheres was contacted to the binder film and transferred thereto. The transfer conditions included a hot can temperature of 104° C., an applied pressure of 31.6 kg/cm width, and a line speed of 6 m/min. These conditions embedded the microsphere to about 20% of their diameter in the binder material. The polyethylene-coated paper carrier can then be stripped from the microspheres which remain in the binder film.

The cover film of Example 1 was used except that it was not corona treated and primed. Instead the ethylene/acrylic acid cover film was applied to the monolayer of microspheres on the base sheet and sealed thereto along a network of interconnecting bonds under the following conditions:

Surface temperature of embossing can: 174° C.,
Embossing speed: 3 m/min.,
Nip roll pressure: 21.1 kg/cm width, After stripping off both PET support films, a pressure-sensitive adhesive layer carried by a protective liner was laminated to the exposed surface of the binder film.

COMPARATIVE EXAMPLE A

A urethane extended polyester with a melamine hardener in solution with solvent is knife coated onto a polyethylene coated paper at an orifice of 6 mils. This polyester coating is dried in an air forced oven to remove solvents and cure the coating. Oven conditions were 20 minutes at 175° F. temperature and 10 minutes at 280° F. temperature. This results in a dried polyester thickness of 2 mils. This cover film was then sealed to the binder layer of example one using the same sealing conditions. After sealing the duplex carrier web and polyethylene coated paper carrier web are removed and an acrylic pressure-sensitive adhesive and protective liner are applied to the exposed side of the binder layer.

This sheeting is similar to commonly used flexible encapsulated-lens retroreflective sheetings used for substrates which are expected to be impacted by vehicles such as is encountered in construction work zone sites.

COMPARATIVE EXAMPLE B

Encapsulated-lens retroreflective sheeting manufactured using same materials and conditions sited in U.S. Pat. No. 4,025,159, Example 1. This is an example of a commonly used sheeting intended for signing use.

TABLE 1

| Example | Elongation (%) | Tensile (lb/in-width | Water Absorb./Penet. (% Brightness Retention) | Water Spray (Failure?) | Impact (inch-lbs) | Brightness |
|---|---|---|---|---|---|---|
| 1 | 135 | 7.5 | 100 | No | 130 | 215 |
| 2 | 140 | 6.5 | 100 | No | 130 | 300 |
| 3 | 100 | 35.0 | 100 | No | 130 | 280 |
| 4 | 350 | 8.0 | 100 | No | 130 | 260 |
| A | 74 | 7.0 | 37 | Yes | 10 | 250 |

TABLE 1-continued

| Example | Elongation (%) | Tensile (lb/in-width) | Water Absorb./Penet. (% Brightness Retention) | Water Spray (Failure?) | Impact (inch-lbs) | Brightness |
| --- | --- | --- | --- | --- | --- | --- |
| B | 6 | 35.0 | 100 | No | 10 | 300 |

Various modifications and a of this invention will become apparent to those skilled in the art without departing from the scope and spirit of this invention.

What is claimed is:

1. An encapsulated-lens retroreflective sheeting comprising a monolayer of lenses partially embedded in a binder layer, a specularly reflective layer underlying the lenses, and a cover film sealed to the binder layer along a network of interconnecting lines forming hermetically sealed cells within which the lenses are encapsulated and have an air interface, wherein:

the cover film comprises polyethylene, or polypropylene; or a copolymer comprising a major portion by weight of at least one of ethylene or propylene and a minor portion by weight of at least one comonomer; blends of polyethylene, polypropylene, or copolymers.

2. The sheeting of claim 1 wherein one of said comonomers is acrylic acid, methacrylic acid, vinyl acetate, or ethyl acrylate.

3. The sheeting of claim 1 wherein said cover film comprises a copolymer comprising a major portion by weight of at least one of ethylene or propylene, and a minor portion by weight of at least one comonomer.

4. The sheeting of claim 1 wherein said cover film is at least 1 mil thick.

5. The sheeting of claim 4 wherein said cover film is between about 1 mil and 10 mils thick.

6. The sheeting of claim 1 wherein said cover film is between about 2 mils and 6 mils thick.

7. The sheeting of claim 1 wherein the inner surface of said cover film is primed to improve compatibility with said binder layer.

8. The sheeting of claim 7 wherein said prime comprises a polymeric priming layer.

9. The sheeting of claim 8 wherein said polymeric priming layer is of the same polymer family as said binder layer.

10. The sheeting of claim 8 wherein said polymeric priming layer comprises aziridine.

11. The sheeting of claim 1 wherein said lenses are glass microspheres.

12. The sheeting of claim 1 wherein said cover film is multi-layer.

13. The sheeting of claim 1 wherein said cover film is dual-layer, comprising:

an inner layer which comprises polyethylene, polypropylene, or a copolymer comprising a major portion by weight of at least one of ethylene or propylene and a minor portion by weight of at least one comonomer; and an outer layer.

14. The sheeting of claim 13 wherein said inner layer comprises a copolymer comprising a major portion by weight of at least one of ethylene or propylene, and a minor portion by weight of at least one comonomer.

15. The sheeting of claim 13 wherein said outer layer comprises a copolymer comprising a major portion by weight of at least one of ethylene or propylene, and a minor portion by weight of at least one comonomer.

16. The sheeting of claim 1 wherein said binder layer is white.

17. The sheeting of claim 1 wherein said binder layer contains a whitening agent.

18. The sheeting of claim 17 wherein said whitening agent is a pigment.

19. The sheeting of claim 1 wherein said binder layer is of a different polymer family from said cover film.

20. The sheeting of claim 1 wherein said cover film comprises a weathering stabilizer.

21. The sheeting of claim 20 wherein said weathering stabilizer comprises at least one of the following: antioxidant, energy quencher, hindered amine light stabilizer or ultraviolet radiation absorber.

22. The sheeting of claim 1 wherein said cover film comprises a dye.

23. The sheeting of claim 1 wherein said cover film has a transmittance of at least 75 percent.

24. The sheeting of claim 1 wherein said cover film has a transmittance of at least 85 percent.

25. The sheeting of claim 1 wherein said cover film comprises a conditioning layer on the outside surface thereof.

* * * * *

UNITED STATES PATENT AND TRADEMARK OFFICE
CERTIFICATE OF CORRECTION

PATENT NO. : 4,896,943
DATED     : January 30, 1990
INVENTOR(S) : Howard R. Tolliver, et al.

It is certified that error appears in the above-identified patent and that said Letters Patent is hereby corrected as shown below:

In Column 1, line 24 "font" should read --front--.

In Column 7, line 49 "6" should read --16--.

In Column 9, line 48 "miorometer" should read --micrometer--.

In Column 10, line 3 "30)" should read --230).--

In Column 11, line 8 "a" should read --alterations--.

Signed and Sealed this

Sixth Day of August, 1991

*Attest:*

HARRY F. MANBECK, JR.

*Attesting Officer*   *Commissioner of Patents and Trademarks*

REEXAMINATION CERTIFICATE (1981st)
United States Patent [19]
Tolliver et al.

[11] B1 4,896,943
[45] Certificate Issued  Apr. 20, 1993

[54] ENCAPSULATED-LENS RETROREFLECTIVE SHEETING HAVING IMPROVED COVER FILM

[75] Inventors: Howard R. Tolliver, Woodbury; Roger R. Kult, Maplewood; Terry R. Bailey, Woodbury; Arthur D. Dickson, St. Paul, all of Minn.

[73] Assignee: Minnesota Mining and Manufacturing Company, St. Paul, Minn.

Reexamination Request:
No. 90/002,727, May 21, 1992

Reexamination Certificate for:
Patent No.: 4,896,943
Issued: Jan. 30, 1990
Appl. No.: 49,674
Filed: May 13, 1987

Certificate of Correction issued Aug. 10, 1992.

[51] Int. Cl.$^5$ .............................................. G02B 5/128
[52] U.S. Cl. .................................. 359/540; 359/536; 283/109; 156/145; 428/325

[58] Field of Search ................. 359/536, 540, 541; 382/109, 75; 156/145, 231; 428/325

[56] References Cited

U.S. PATENT DOCUMENTS 2,948,191  8/1960  Hodgson, Jr. et al. ................. 88/82
4,897,136  1/1990  Bailey et al. ......................... 156/145

*Primary Examiner*—Loha Ben

[57] ABSTRACT

An encapsulated-lens retroreflective sheeting comprising a monolayer of lenses partially embedded in a binder layer, a specularly reflective layer underlying the lenses, and a cover film sealed to the binder layer along a network of interconnecting lines forming hermetically sealed cells within which the lenses are encapsulated and have an air interface, wherein the cover film comprises polyethylene, or polypropylene, or a copolymer comprising a major portion by weight of at least one of ethylene or propylene and a minor portion by weight of a comonomer. Such a cover film affords high flexibility, improved impact resistance, resistance to moisture absorption, and greater toughness to the retroreflective sheeting. In some embodiments the cover film is multilayer.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-25, dependent on an amended claim, are determined to be patentable.

1. An encapsulated-lens retroreflective sheeting comprising a monolayer of lenses partially embedded in a binder layer, a specularly reflective layer underlying the lenses, and a cover film sealed to the binder layer along a network of interconnecting lines forming hermetically sealed cells within which the lenses are encapsulated and have an air interface, wherein:

the cover film comprises *low-density* polyethylene, or polypropylene; or a copolymer comprising a major portion by weight of at least one of ethylene or propylene and a minor portion by weight of at least one comonomer; blends of polyethylene, polypropylene, or copolymers.

* * * * *